3,076,002
16,24-CYCLO-21-NORCHOLATRIENE DERIVATIVES

Monroe E. Wall, Chapel Hill, N.C., and Samuel Serota, Philadelphia, and Harold E. Kenney, Chalfont, Pa., assignors to the United States of America as represented by the Secretary of Agriculture
No Drawing. Filed May 1, 1962, Ser. No. 191,648
11 Claims. (Cl. 260—397.45)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This application is a continuation-in-part of application bearing Serial No. 97,110, filed March 20, 1961, now abandoned.

This invention relates to a novel series of steroids having aromatic 6-membered ring fused to carbon atoms 16 and 17, and to process for preparation thereof. These compounds can be regarded as derivatives of 16,24-cyclo-21-norcholatriene.

In our copending application entitled "16,24-Cyclo-21-Norcholene Derivatives," Serial No. 97,109 filed March 20, 1961, now abandoned, there is described the heating of 12-keto-16-dehydropregnenes with acetone in the presence of a base to produce the starting materials for the compounds of the present invention.

In general according to the present invention a 16,24-cyclo-21-norcholene derivative of the general Formula I

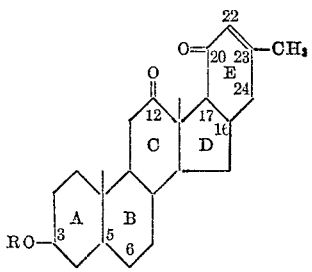

wherein the fusion of the rings A and B is $5\alpha$, $5\beta$ or $\Delta^5$, the position of the —OR group is $3\alpha$ or $3\beta$, and R is hydrogen atom or an acyl radical derived from a lower (short carbon chain) saturated fatty acid, is heated with an N-halosuccinimide in an organic solvent inert to the solutes to give a compound of the general Formula II

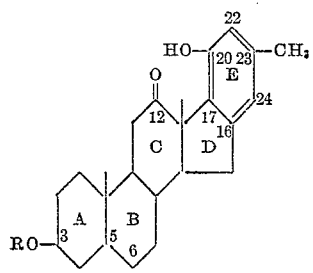

wherein the fusion of the A/B rings, the position of the —OR group, and the R radical are as described for the starting compound.

Novel steroids of general Formula II have been demonstrated to have an excitatory effect on the exocrine secretion of the pancreas. The exocrine fluids from the pancreas are a source of enzymes which aid in food digestion and also are a source of chemical means for assisting in control of acidity of the upper intestinal tract.

N-halosuccinimides such as N-chlorosuccinimide, N-bromosuccinimide and N-iodosuccinimide may be employed for the reaction, the N-bromosuccinimide usually being the most readily available.

The reaction may be conducted in any organic solvent which is inert to the reactants, preferred solvents being hydrocarbons or chlorinated hydrocarbons.

The reaction is conveniently carried out at the boiling temperature of the solvent, employing reflux conditions, but the use of lower temperatures for longer periods of time may also be employed.

While various conventional procedures may be used to separate the product from the reaction mixture, a convenient method is to wash out water solubles, then dry the organic phase, followed by evaporation of the solvent and separation of the product from the residue by recrystallization from a solvent or by chromatography followed by crystallization.

The product quite unexpectedly contained no halogen, having undergone dehydrobromination to give an aromatic ring. The C-20 carbonyl group is converted to a phenolic hydroxyl group. Although this reaction proceeds in the absence of a catalyst, we have found it advantageous to add a catalyst such as benzoyl peroxide or alpha,alpha'-azo-di-iso-butyronitrile to the N-halosuccinimide-solvent system.

Having described our invention the following examples illustrate its use.

*Example 1*

A sample of 1.0 g. of $3\beta$-acetoxy-$5\alpha$-23-methyl-16,24-cyclo-21-nor $\Delta^{22(23)}$ -cholene-12,20-dione, 20 ml. of carbon tetrachloride, 0.43 g. of N-bromosuccinimide and 0.02 g. of alpha,alpha'-azo-di-iso-butyronitrile were combined in a flask equipped with a reflux condenser and heated at the boiling point of the mixture for 30 minutes. The reaction mixture was cooled, washed with water, and the carbon tetrachloride layer dried over anhydrous sodium sulfate. The dried carbon tetrachloride solution was removed from the sodium sulfate and the solvent evaporated in a nitrogen gas atmosphere. From the residue was separated by chromatography the crystalline product, $3\beta$ - acetoxy-20-hydroxy-$5\alpha$-23-methyl-16,24-cyclo-21-nor- $\Delta^{16(24),17(20),22(23)}$ -cholatriene-12-one, M.P. 287.5–288.5° C.

*Example 2*

Employing essentially the same procedure as described in Example 1, $3\beta$-acetoxy-23-methyl-16,24-cyclo-21-nor-$\Delta^{5(6),22(23)}$ -choladiene-12,20-dione was converted to $3\beta$-acetoxy-20-hydroxy-23-methyl-16,24-cyclo-21-nor- $\Delta^{5(6),16(24),17(20),22(23)}$-cholatetraene-12-one.

We claim:
1. A compound of the general formula

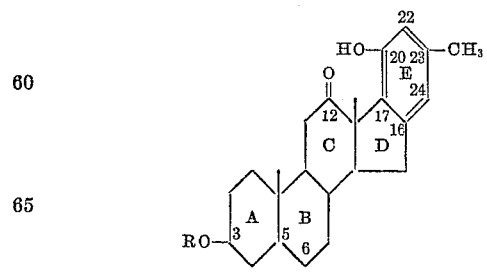

wherein the fusion of the rings A and B is selected from the group consisting of $5\alpha$, $5\beta$, and $\Delta^{5(6)}$, R is selected from the group consisting of a hydrogen atom and an acyl radical derived from a lower saturated fatty acid, and the position of the —OR group at C–3 is selected from the group consisting of α and β.

2. A compound of the general formula of claim 1 in which the fusion of the rings A and B is 5α, the position of the —OR group 3β, and R is selected from the group consisting of a hydrogen atom and an acyl radical derived from a lower saturated fatty acid.

3. 3β,20 - dihydroxy-5α-23-methyl-16,24-cyclo-21-nor-$\Delta^{16(24),17(20),22(23)}$-cholatriene-12-one.

4. 3β - acetoxy-20-hydroxy-5α-23-methyl-16,24 - cyclo-21-nor-$\Delta^{16(24),17(20),22(23)}$-cholatriene-12-one.

5. A compound of the general formula of claim 1 in which the fusion of the rings A and B is $\Delta^{5(6)}$, the position of the —OR group is 3β, and R is selected from the group consisting of a hydrogen atom and an acyl radical derived from a lower saturated fatty acid.

6. 3β,20-dihydroxy-23-methyl-16,24-cyclo-21-nor-$\Delta^{5(6),16(24),17(20),22(23)}$-cholatetraene-12-one.

7. 3β - acetoxy-20-hydroxy-23-methyl-16,24-cyclo - 21-nor-$\Delta^{5(6),16(24),17(20),22(23)}$-cholatetraene-12-one.

8. A process comprising heating a 16,24-cyclo-21-norcholene derivative of the general formula

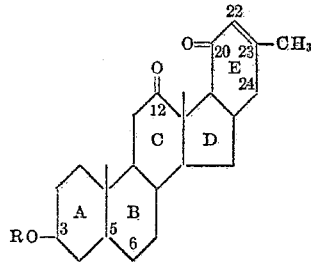

wherein the fusion of the rings A and B is selected from the group consisting of 5α, 5β, and $\Delta^{5(6)}$, R is selected from the group consisting of a hydrogen atom and an acyl radical derived from a lower saturated fatty acid, and the position of the —OR group at C–3 is selected from the group consisting of α and β, with an N-halosuccinimide in an organic solvent inert to the solutes and separating from the reaction mixture a compound of the general formula

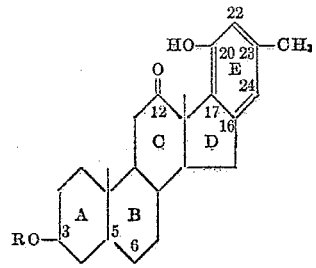

wherein fusion of the A/B rings, position of the —OR group, and R retain the characteristics of the starting compound.

9. The process of claim 8 in which the organic solvent is selected from the group consisting of a hydrocarbon and a chlorinated hydrocarbon.

10. The process of claim 9 in which the organic solvent is a chlorinated hydrocarbon.

11. The process of claim 10 in which the chlorinated hydrocarbon is carbon tetrachloride and the N-halosuccinimide is N-bromosuccinimide.

No references cited.